United States Patent [19]
Schaefer

[11] Patent Number: 5,604,838
[45] Date of Patent: Feb. 18, 1997

[54] METHOD AND APPARATUS FOR RECORDING AND READING A MULTIPLEXED VIDEO SIGNAL

[75] Inventor: Louis F. Schaefer, Palo Alto, Calif.

[73] Assignee: Samsung Electronics Co., Ltd., Kyungki-do, Rep. of Korea

[21] Appl. No.: 341,035

[22] Filed: Nov. 15, 1994

Related U.S. Application Data

[63] Continuation of Ser. No. 944,982, Sep. 15, 1992, abandoned.

[51] Int. Cl.⁶ .................... H04N 5/91; G11B 5/02
[52] U.S. Cl. .................... 386/122; 360/22; 369/97
[58] Field of Search .................... 369/99, 102, 124, 369/48, 49, 50, 100, 109–111, 97; 358/342, 335, 310, 322; 360/22–23, 33.1, 35.1; 386/122; H04N 5/76, 5/78, 5/781, 5/782, 5/783, 9/89, 9/79, 5/92

[56] References Cited

U.S. PATENT DOCUMENTS

| | | |
|---|---|---|
| 3,412,214 | 11/1968 | Gabor ............................ 360/22 |
| 4,264,986 | 4/1981 | Willis . |
| 4,371,954 | 2/1983 | Cornet . |
| 4,398,203 | 8/1983 | Cornet . |
| 4,404,656 | 9/1983 | Cornet . |
| 4,538,159 | 8/1985 | Gupta et al. . |
| 4,647,947 | 3/1987 | Takeoka et al. . |
| 4,719,615 | 1/1988 | Feyrer et al. . |
| 4,815,067 | 3/1989 | Webster et al. ............. 369/97 |
| 4,870,507 | 9/1989 | Ahn et al. ................... 358/310 |
| 4,912,696 | 3/1990 | Feyrer et al. . |
| 5,060,078 | 10/1991 | Mitsuhashi ................. 358/340 |
| 5,063,555 | 11/1991 | Miyoshi et al. ............ 369/97 |
| 5,134,499 | 7/1992 | Sata et al. ................... 358/342 |
| 5,162,922 | 11/1992 | Takemura et al. ......... 358/342 |
| 5,223,942 | 6/1993 | Sakaegi et al. ............ 358/310 |
| 5,224,011 | 6/1993 | Yalla et al. ................. 361/93 |
| 5,231,872 | 8/1993 | Bowler et al. ............. 73/146.5 |
| 5,233,480 | 8/1993 | Edo et al. ................... 360/32 |

*Primary Examiner*—Thai Q. Tran
*Attorney, Agent, or Firm*—Burns, Doane, Secker & Mathis, LLP

[57] ABSTRACT

The present invention relates to video recording and playback techniques and devices which create relative movement between a laser and an optical medium such as a flexible optical tape to permit recording of relatively high bandwidth signals. Further, the present invention relates to video recording and playback techniques and devices which optimize relative movement between a laser source and the optical medium in a cost-effective manner. Data spots having a set of predetermined feature sizes (i.e., set of varying hole sizes) can thus be recorded at a rate useful for high bandwidth signals (e.g., television video signals). Further, recording on a flexible optical medium (e.g., optical tape) can be performed in a manner which optimizes space efficiency on the tape.

13 Claims, 1 Drawing Sheet

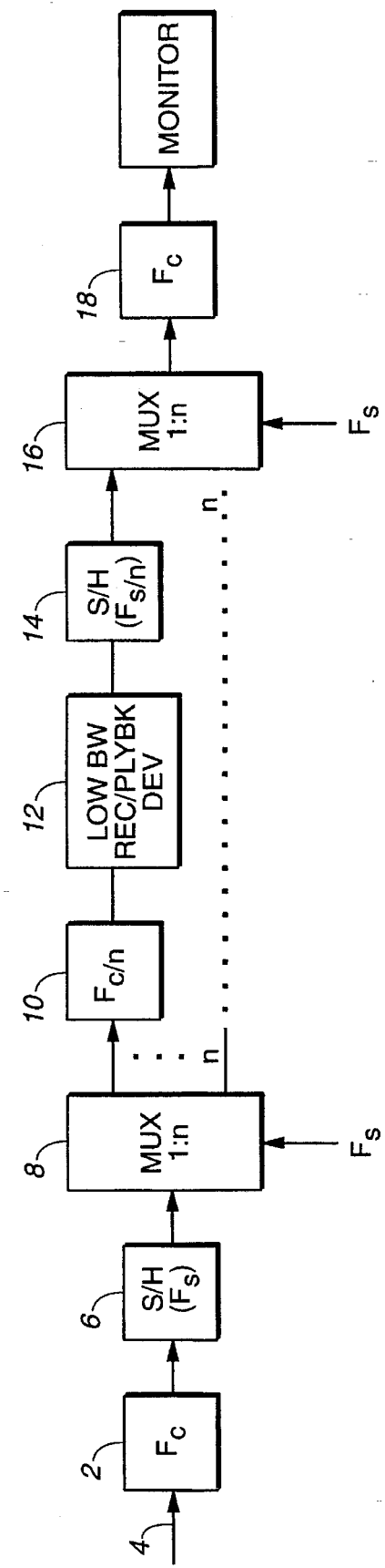
FIG._1

METHOD AND APPARATUS FOR RECORDING AND READING A MULTIPLEXED VIDEO SIGNAL

This application is a continuation of application Ser. No. 07/944,982 filed Sep. 15, 1992, now abandoned.

BACKGROUND OF THE INVENTION

1. Field of the Invention

The present invention relates generally to video recording and playback. More particularly, the invention relates to the optical writing and reading of data with respect to a storage medium such as a flexible optical tape.

2. State of the Art

Presently, flexible tape for optical storage of data is known, as described in U.S. Pat. Nos. 4,719,615 and 4,912,696, both identified on their cover page as being assigned to Optical Data, Inc. To optically record data on a medium such as a flexible optical tape, a scanning beam of laser light can be directed onto the tape. The laser beam melts the tape or burns holes in the tape to produce data spots representing bits of data. The data spots thus have a reflectivity, transmissivity or other optical characteristic which can be distinguished from the background of the optical tape.

Use of a laser to establish data spots representing bits of digital data or analog data on the flexible tape must be selected with practical limitations in mind. For example, in moving a laser back and forth across a moving tape, there is a limit to how rapidly the optical characteristics of a spot on the tape can be altered to form a data spot. Such a limit can be significant when, for example, the information being recorded corresponds to the video information of a television signal having a relatively high bandwidth. Further, such a limitation can be significant when attempting to optimize space efficiency in recording plural data spots on the optical tape.

For example, a relatively low intensity laser can be used to record the data spots on the tape. However, this requires that the tape be moved relatively slowly thus limiting the ability of the system to record high bandwidth signals in real time.

Alternately, an extremely high power laser can be used to record data spots. However, such lasers are extremely expensive and thus limit the commercial benefit to designing an optical recording and playback system which can be used as, for example, an optical video recorder (i.e., VCR). Further, when using a powerful laser with an optically sensitive tape, relative movement between the laser and the tape must be established which will permit the recording of relatively high bandwidth television video signals.

For example, to facilitate subsequent reading of data which is recorded using the known modified frequency modulation (MFM) technique, a one to two micron data spot included in a set of variable size data spots should be recorded such that it is spaced from a succeeding data spot by one to two microns of tape space. This prevents overlapping of the spots while optimizing space efficiency. To optimize the use of a high intensity laser to record these high bandwidth signals efficiently on the optical tape, the laser must be able to scan quickly back and forth across the tape. However, implementations of such high velocity deflection typically incur additional expense which, as noted above, hinders commercial feasibility of an optical VCR.

Plural low intensity lasers can be combined so that their beams overlap on the recording medium. However, such systems cannot be practically extended beyond the use of two overlapping laser beams. Although dual beam systems are cost effective in increasing laser light intensity, they are very awkward. This is especially true when the combined laser beam must be rapidly scanned to exploit the increased intensity.

It would therefore be desirable to provide an optical system capable of writing and reading high bandwidth spots onto flexible optical tape. However, to provide a cost effective system, it would be desirable to use one or more relatively low intensity, low cost lasers which do not require rapid scanning. Assuming that these competing criteria (i.e., high bandwidth signal recorded by a slow scan, low intensity laser) can be satisfied, it would be desirable to exploit the recording capability in a commercial environment, such as an optical VCR for television signal recording.

SUMMARY OF THE INVENTION

The present invention relates to video recording and playback techniques and devices which create relative movement between a laser and an optical medium such as a flexible optical tape to permit recording of relatively high bandwidth signals. Further, the present invention relates to video recording and playback techniques and devices which optimize relative movement between a laser source and the optical medium in a cost-effective manner. Data spots having a set of predetermined feature sizes (i.e., set of varying hole sizes) can thus be recorded at a rate useful for high bandwidth signals (e.g., television video signals). Further, recording on a flexible optical medium (e.g., optical tape) can be performed in a manner which optimizes space efficiency on the tape.

In a preferred embodiment, an apparatus for storing and reading video information on an optical recording medium includes means for receiving an analog video signal having a first frequency bandwidth; means for distributing said video signal into a plurality of distributed analog signals having frequency bandwidths which are less than said first frequency bandwidth; means for recording each of said distributed signals onto the optical recording medium and for reading said distributed signals from the optical recording medium; means for reproducing said analog video signal by reassembling said distributed signals read from the optical recording medium; and means for outputting said reproduced analog video signal.

BRIEF DESCRIPTIONS OF THE DRAWINGS

Other objects and advantages of the present invention will become more apparent from the following detailed description of preferred embodiments as described in conjunction with the accompanying drawing in which:

FIG. 1 shows an exemplary recording and playback system in accordance with a preferred embodiment.

DETAILED DESCRIPTION OF THE PREFERRED EMBODIMENTS

FIG. 1 shows an exemplary preferred embodiment of a recording and playback system for reading and storing information, such as video information on an optical medium such as a flexible optical tape. The FIG. 1 system includes a receiving means which comprises a filter 2 and a signal input line 4. The filter 2 is preferably a low pass filter for removing excess bandwidth from an input signal. For example, where the input signal on input line 4 is a wide bandwidth analog video signal, a cutoff frequency $F_c$ of the filter 2 removes all frequencies above significant frequency components of the input signal, as determined by the user.

In the known NTSC system, a television signal includes plural television signal frames composed of two interlaced fields of television horizontal scan lines. These two fields are commonly referred to as an even field (i.e., consisting of the even numbered scan lines in the television signal frame) and an odd field (i.e., consisting of the odd numbered scan lines in the television signal frame).

Known video recording systems typically record all television scan lines of any given field in a single track of the recording medium traced by the recording head. To preserve the video signal on a storage medium (e.g., flexible optical tape) such that it can be replayed at a later time, all video signal information including the traditional horizontal scan lines must be recorded. Where the input analog signal is a television signal, an exemplary cutoff frequency for the filter 2 is approximately 4 MHz. Of course, for higher bandwidth signals such as those signals associated with high definition television signals, the cutoff frequency of the filter 2 would be higher.

Assuming that the information being recorded is television video information, significant frequency components of the signal passed by the filter 2 are input to a distributing means which includes a sample and hold circuit 6, and a multiplexer 8 which distributes the signal into a plurality of n channels. The sample and hold circuit 6 is driven at a sampling frequency $F_s$ which is greater than or equal to two times the highest significant frequency component of the analog input signal. For example, where the analog input signal is a typical television signal, the sampling frequency of the sample and hold circuit 6 can be approximately 10 Mhz. The sample and hold circuit 6 outputs a digital or analog signal. In an exemplary embodiment described herein, the sample and hold circuit merely detects the amplitude of the analog input signal with a frequency dictated by the sampling frequency, and outputs sampled analog values representing a sampled analog signal.

The sampled analog signal is input to the multiplexer 8. The multiplexer 8 distributes the sample values to the various channels of the multiplexer. The multiplexer switches from one channel to the next at the aforementioned sampling frequency. Thus, the frequency of samples in any one channel associated with the multiplexer will be $F_s/n$, where n is the number of channels. Where eight channels are used, the frequency in any one of these channels would therefore be 10 Mhz/8 or 1.25 MHz.

All of the channels associated with the multiplexer are identical. Accordingly, only one of these channels will be described in detail. Referring to FIG. 1, the first channel of the multiplexer includes a low pass filter 10. The cutoff frequency of the low pass filter 10 corresponds to the cutoff frequency of the filter 2 divided n. In the above example, the cutoff frequency of the low pass filter 10 would therefore be 4 MHz/8 or 0.5 MHz.

Sample values from the low pass filter 10 are input to a low bandwidth record and playback device 12. A separate low bandwidth, optical recording and playback device is provided for each channel. Of course it will be apparent to those skilled in the art that the devices in each of the channels can be combined into a single device.

In the optical recording and playback device 12, a laser is scanned over plural tracks of the optical tape, writing data on the tape as it scans. A playback laser can similarly be scanned over the recorded data to detect changes in reflectivity as indications of recorded data spots on the tape. The recorded information can then be directed to a video monitor for display.

Where the recording medium is a flexible optical tape, the low bandwidth record and playback device 12 is a relatively low power laser which is deflected at a relatively low scan rate back and forth across a single channel area established on the flexible optical tape. For example, a deflection technique can be used which is similar to that described in co-pending, commonly assigned U.S. application Ser. No. 07/944,978, Attorney Docket No. 023833-010, filed Sep. 15, 1992, entitled "Bidirectional Sinusoidal Scanning System", the disclosure of which is hereby incorporated by reference in its entirety. Because the frequency of the signal in any one of the channels associated with the multiplexer 8 is significantly less than that of the original wide bandwidth analog signal at input 4, a relatively cost-effective laser can be used. Further, because the laser can be scanned at a relatively slow rate within a narrow channel, a relatively cost-effective deflector for scanning the laser beam can be used. The selection of these cost-effective devices does not, however, limit the accuracy with which information is recorded on the tape nor is the space efficiency in recording the data on the tape compromised.

The low bandwidth analog signal recorded on the tape does not resemble the analog input signal. Rather, the analog input signal is now represented as n low frequency signals recorded in each of the n channels. To facilitate subsequent reading of data which is recorded using the known modified frequency modulation (MFM) technique, a one to two micron data spot included in a set of variable size data spots is recorded such that it is spaced from a succeeding data spot by one to two microns of tape space. The spots are not necessarily formed on the tape as circles. For example, the spot can be a minimum size of 1 micron, both in width and length. It can also have variable lengths of, for example, 1.5 or 2 microns, but with the constant width of 1 micron.

The channels can be recorded on the tape side-by-side parallel to tape movement direction. Thus, as the tape moves beneath the lasers, each laser can simultaneously record data in a given channel on the tape. For example, these parallel channels can be formatted on the tape in a manner similar to the parallel bands described with respect to FIG. 5 in the commonly assigned, co-pending application entitled "Wide Beam Detector System for Optical Memories", U.S. Pat. No. 5,237,556, the disclosure of which is hereby incorporated by reference in its entirety.

To read data stored in the various channels of the flexible optical tape, a reproducing means is provided in the FIG. 1 system. The reproducing means includes a sample and hold circuit for each channel. One of these sample and hold circuits is associated with the first channel described above and is represented as sample and hold circuit 14. Outputs from the sample and hold circuits in each of the n channels are input to a single demultiplexer 16.

The demultiplexer 16 operates at a frequency which is synchronized with the multiplexer 8. Accordingly, the relatively low bandwidth signals recorded in each of the aforementioned channels can be sampled by each of the n sampler and hold circuits 14 and reassembled by the demultiplexer 16 so that an output from the demultiplexer 16 corresponds to the sampled analog signal input to the multiplexer 8. Because the output from the demultiplexer 16 is a sampled signal, this signal is input to an output means which includes another low pass filter 18. Again, the low pass filter 18 includes a cutoff frequency similar to that of filter 2 (i.e., 4 MHz).

The low pass filter 18 smooths the output signal so that it better resembles the wide bandwidth analog video signal output from the filter 2. Further, the low pass filter 18 eliminates high frequency noise due to the relatively high frequency sampling operations performed by the demultiplexer 16.

Although an exemplary embodiment has been discussed in the context of an optical system which uses flexible optical tape, it will be appreciated that the invention can be applied to any system which optically records or reads data. Further, although the exemplary embodiment has been described in the context of a television video signal, it will be appreciated that any signals can be recorded using the above-identified technique.

However, the present invention permits significant benefits to be realized during the reading and/or writing of a high bandwidth television signal onto a storage medium such as a flexible optical medium. It will be appreciated by those skilled in the art that a key feature is the use of n low bandwidth recording channels to process and pass all information associated with a much higher bandwidth signal while decreasing mechanical constraints of the system. Such a feature is extremely useful in the optical recording of data on a flexible optical recording tape where the recording bandwidth is limited by the combination of laser power and media sensitivity. The present invention thus represents an efficient and cost effective way of converting the high sample rate associated with input signals such as television video signals into low bandwidth signals which can be processed in low bandwidth channels without sacrificing faithful reproduction of the original analog signal.

An exemplary embodiment has also been described wherein data spots are optically recorded using MFM modulation. However, it will be appreciated by those skilled in the art that the present invention can be used to record data spots on an optically sensitive medium using any known modulation technique (e.g., frequency modulation (FM)) provided appropriate spacing exists between recorded spots on the medium to permit subsequent reading.

Further, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

I claim:

1. Apparatus for storing and reading video information on an optical recording medium comprising:

means for receiving an analog video signal having a first frequency bandwidth, said receiving means including a first low pass filter having a first predetermined cutoff frequency;

distributing means for sampling the analog video signal and distributing the sampled analog signal into a number of distributed channels, each of which has a frequency bandwidth less than said first frequency bandwidth, and each of which includes a low pass filter having a second cutoff frequency, said first predetermined cutoff frequency being a multiple of said second cutoff frequency, said multiple corresponding to said number of distributed channels;

means for recording a signal from each of said distributed channels onto the optical recording medium and for reading said distributed signals from the optical recording medium, said means for recording and for reading including a scanning laser which receives signals from a multiplicity of said plurality of distributed channels;

means for reproducing said analog video signal by reassembling said distributed signals read from the optical recording medium; and means for outputting said reproduced analog video signal.

2. Apparatus according to claim 1, wherein said distributing means includes:

a sample and hold circuit for sampling said analog video signal to generate the sampled analog signal, the sampled analog signal having a first sample frequency: and a multiplexer for distributing said sampled analog signal into the plurality of channels, each of said channels including a signal with a frequency less than said first sample frequency.

3. Apparatus according to claim 2, wherein said means for recording further includes:

a laser source in each of said channels.

4. Apparatus according to claim 3, wherein said means for reproducing further includes:

a sample and hold circuit in each of said channels; and a multiplexer for reassembling the data produced by each of said channel sample and hold circuits.

5. Apparatus according to claim 4, wherein said output means includes a low pass filter having a cutoff frequency which corresponds to said first predetermined cutoff frequency of said first filter.

6. Apparatus for according to claim 5, wherein said optical recording medium is a flexible optical tape.

7. Apparatus for recording video information on an optical recording medium comprising:

means for receiving an analog video signal having a first frequency bandwidth, said receiving means including a first predetermined cutoff frequency;

means for sampling the analog video signal and distributing the sampled analog signal into a number of distributed channels having frequency bandwidths less than said first frequency bandwidth, each of said number of distributed channels including a low pass filter having a second cutoff frequency, said first predetermined cutoff frequency being a multiple of said second cutoff frequency with said multiple corresponding to said number of distributed channels; and means for recording signals in each of said distributed channels onto a separate channel of the optical recording medium, said recording means including a scanning light source for receiving signals from multiple channels of said number of distributed channels.

8. Apparatus for reading video information from an optical recording medium comprising:

means for reading distributed video signals from a number of channels of data stored on an optical recording medium, said reading means including a scanning laser for receiving sampled analog signals from multiple channels of said number of channels, each of said number of channels including a low pass filter with a first cutoff frequency;

means for reproducing an input analog video signal by reassembling said distributed signals read from the optical recording medium into a signal having a bandwidth greater than the bandwidth of each of said channels; and means for outputting said reproduced analog video signal, said outputting means including a low pass filter having a second cutoff frequency, said second cutoff frequency being a multiple of said first cutoff frequency with said multiple corresponding to said number of said channels.

9. Method for storing and reading video information on an optical recording medium comprising the steps of:

receiving an analog video signal having a first frequency bandwidth by filtering said analog video signal with a first low pass filter having a first predetermined cutoff frequency;

sampling said analog video signal and distributing the sampled analog signal into a number of distributed channels, each of which has a frequency bandwidth less than said first frequency bandwidth and each of which includes a low pass filter having a second cutoff frequency, said first predetermined cutoff frequency being a multiple of said second cutoff frequency, with said multiple corresponding to said number of distributed channels;

recording a sampled signal from each of said distributed channels onto the optical recording medium using a scanning laser which receives signals from a multiplicity of said distributed channels and subsequently reading said signals from the optical recording medium using said scanning laser;

reproducing said analog video signal by reassembling said signals read from the optical recording medium; and outputting said reproduced analog video signal.

10. Method according to claim 9, wherein said step of distributing further includes the steps of:

sampling said analog video signal at a first sampling rate; and distributing said sampled analog video signal into a plurality of channels such that the bandwidth of each of said channels is less than the bandwidth of said analog video signal.

11. Method according to claim 10, wherein said step of reproducing further includes the steps of:

sampling the distributed analog video signal in each of said channels; and reassembling each of said distributed analog video signals into a single analog video signal having a bandwidth greater than the bandwidth of any one channel.

12. Method according to claim 11, wherein said step of outputting further includes the step of:

reproducing said analog video signal received during said step of receiving.

13. Method according to claim 12, wherein said optical recording medium is a flexible optical tape.

* * * * *